United States Patent
Vermonet et al.

(10) Patent No.: US 6,968,827 B2
(45) Date of Patent: Nov. 29, 2005

(54) DIESEL ENGINE COMPRISING A DEVICE FOR CONTROLLING THE FLOW OF INJECTED FUEL

(75) Inventors: Claire Vermonet, Paris (FR); Vincent Souchon, Paris (FR); Guillaume Meissonnier, Landes le Gaulois (FR)

(73) Assignees: Peugeot Citroen Automobiles SA, (FR); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/511,336

(22) PCT Filed: Apr. 8, 2003

(86) PCT No.: PCT/FR03/01100

§ 371 (c)(1),
(2), (4) Date: Feb. 8, 2005

(87) PCT Pub. No.: WO03/087562

PCT Pub. Date: Oct. 23, 2003

(65) Prior Publication Data
US 2005/0121000 A1 Jun. 9, 2005

(30) Foreign Application Priority Data
Apr. 17, 2002 (FR) .................................. 02 04815

(51) Int. Cl.⁷ ............................................. F02M 7/00
(52) U.S. Cl. ...................................... 123/435; 123/299
(58) Field of Search ............................... 123/435, 299, 123/300

(56) References Cited

U.S. PATENT DOCUMENTS

| | | | |
|---|---|---|---|
| 5,070,836 A | 12/1991 | Wahl et al. | |
| 5,941,213 A | 8/1999 | Ishii et al. | |
| 6,062,193 A | 5/2000 | Gatellier | |
| 6,502,563 B2 * | 1/2003 | Itoyama | 123/568.21 |
| 6,508,229 B2 * | 1/2003 | Miyakubo et al. | 123/305 |
| 6,857,263 B2 * | 2/2005 | Gray et al. | 60/278 |
| 2001/0052335 A1 * | 12/2001 | Miyakubo et al. | 123/305 |
| 2004/0055282 A1 * | 3/2004 | Gray et al. | 60/278 |
| 2005/0090966 A1 * | 4/2005 | Strom et al. | 701/109 |

FOREIGN PATENT DOCUMENTS

| | | |
|---|---|---|
| DE | 43 12 587 A | 10/1994 |
| EP | 1 132 596 A | 9/2001 |
| WO | WO-99/61771 A | 12/1999 |

* cited by examiner

Primary Examiner—John T. Kwon
(74) Attorney, Agent, or Firm—Fulbright & Jaworski LLP

(57) ABSTRACT

The invention relates to a diesel engine comprising a device for controlling the flow of injected fuel with at least one fuel injector supplying a combustion chamber, controlled by a processor provided with means for controlling a series of operations of the injector of differing durations, means for measuring a minimal activation time ($\Delta T_{MA+}\Delta T$) between the issuing of a command and the beginning of an injection and means for subsequently controlling the injector as a function of the measured minimal activation time. According to the invention, the engine is characterized in comprising means for determining the heat output (dQ) brought about by the mixture of air and fuel injected into the chamber and to measure the minimum activation time using said determinations.

14 Claims, 9 Drawing Sheets

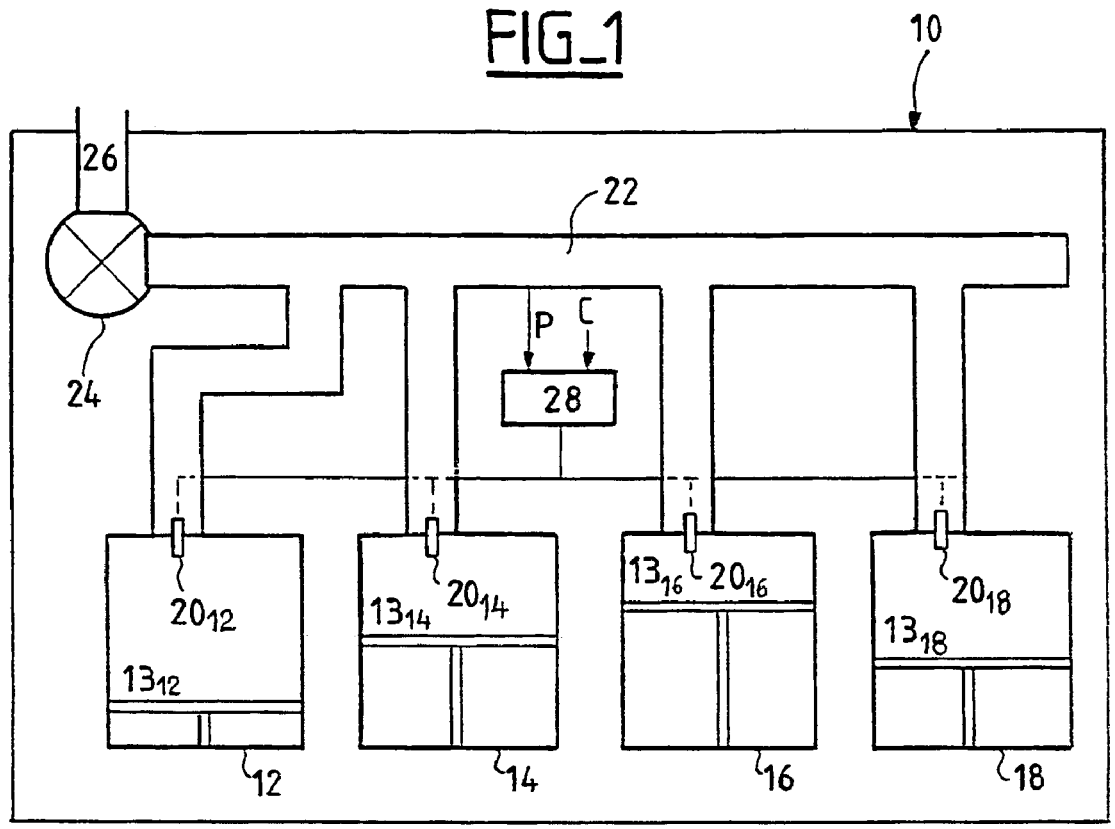
FIG_1
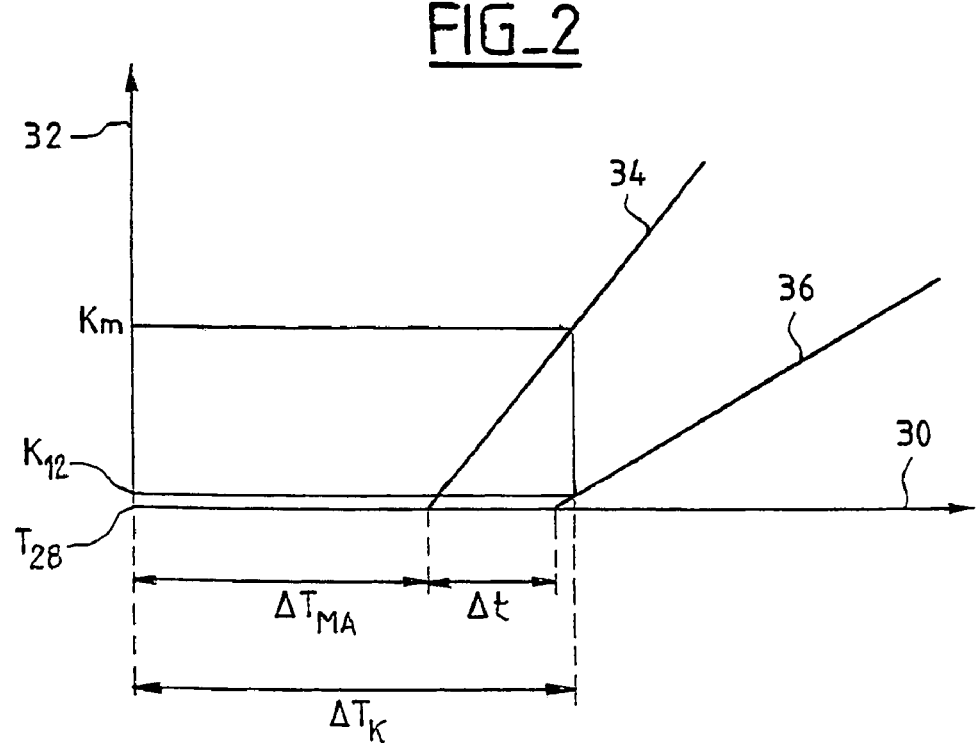
FIG_2

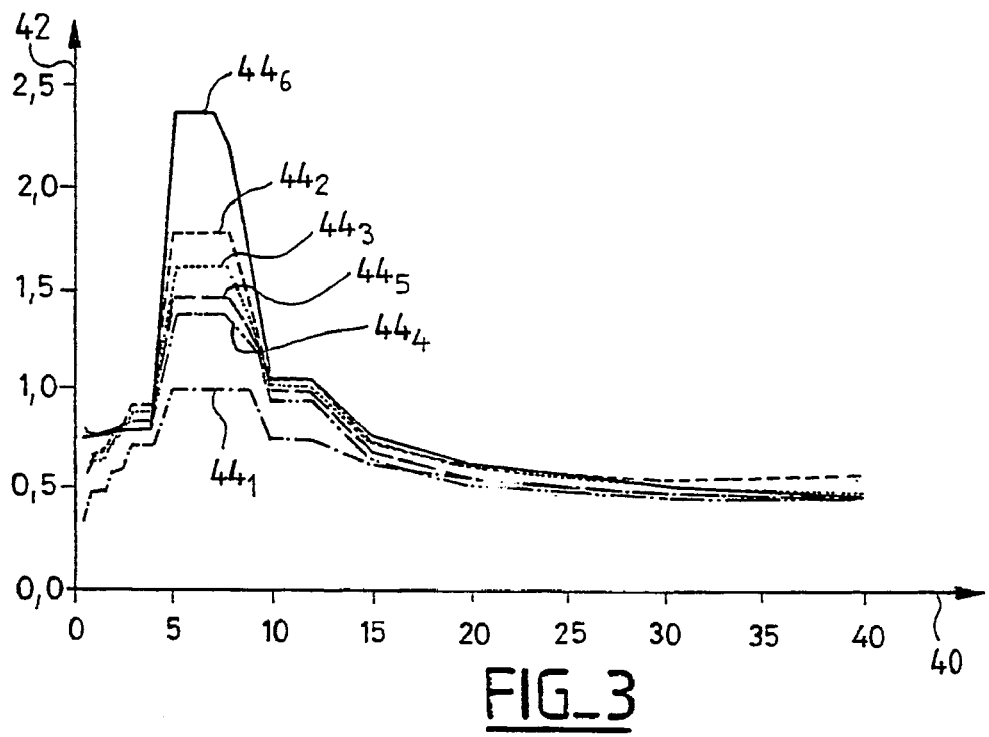
FIG_3
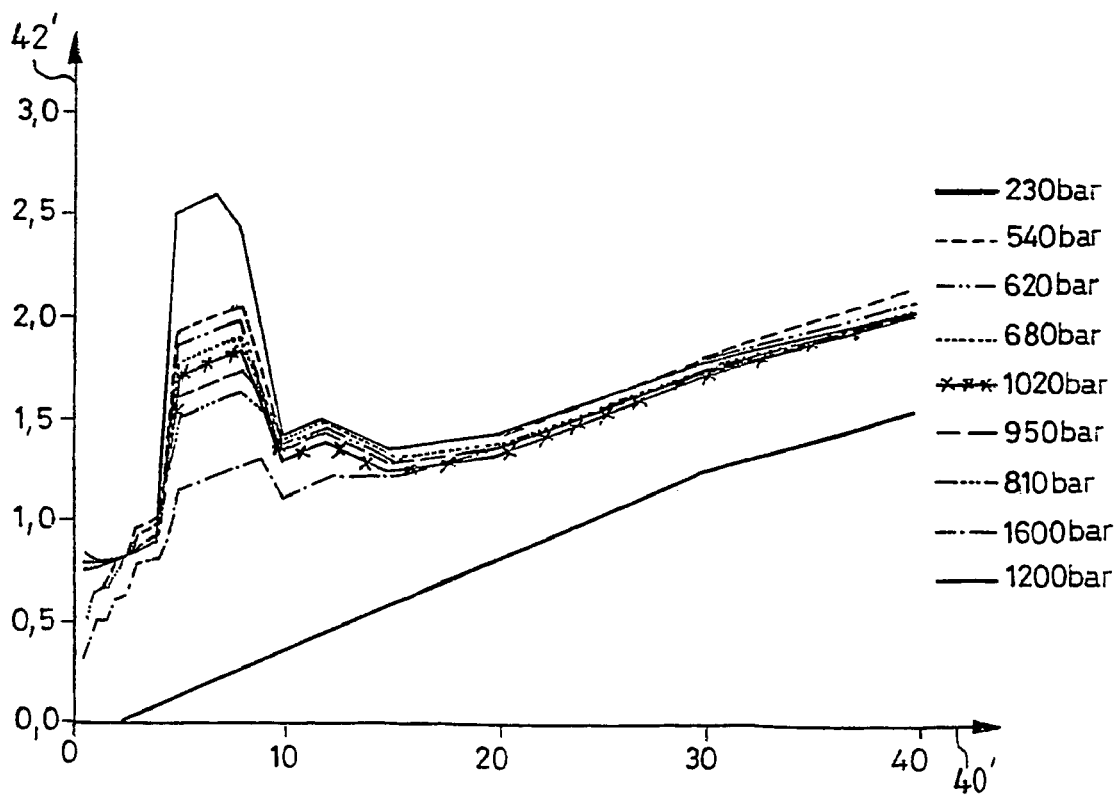
FIG_4

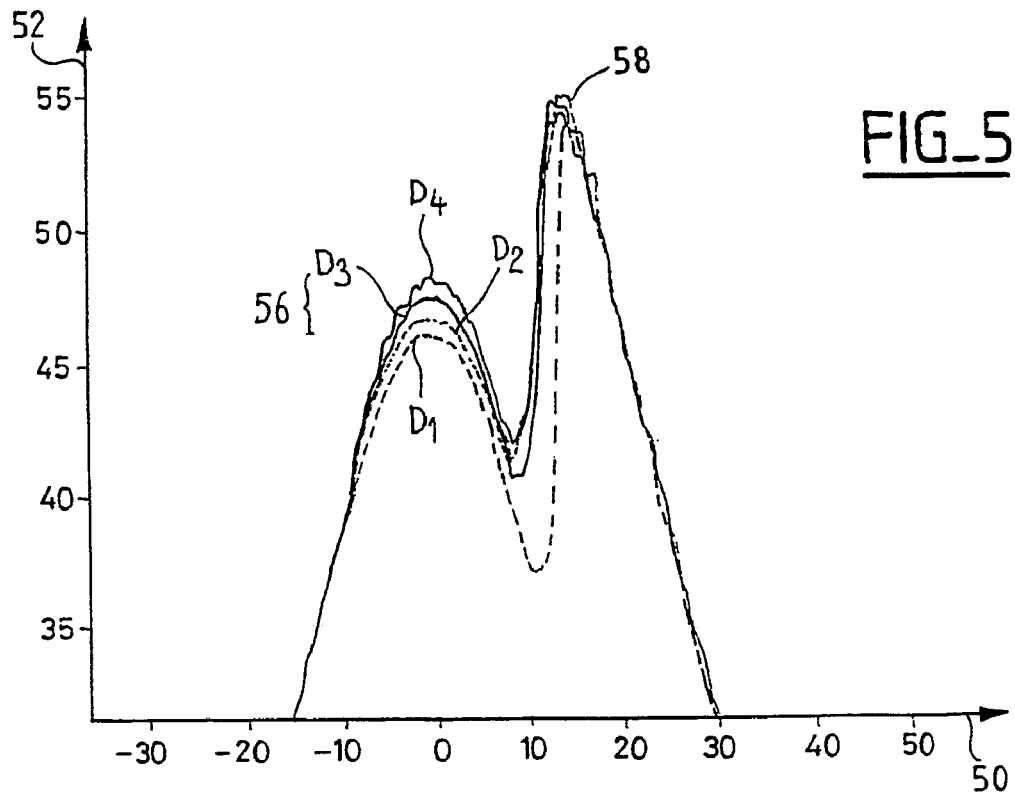
FIG_5
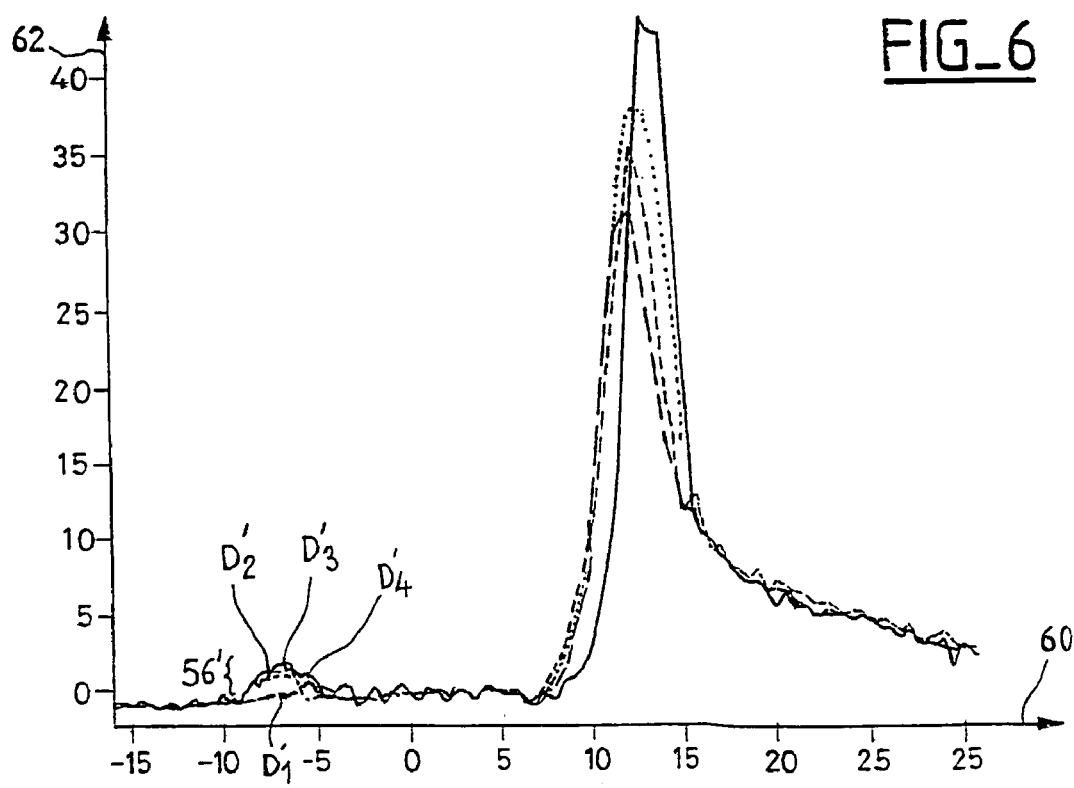
FIG_6

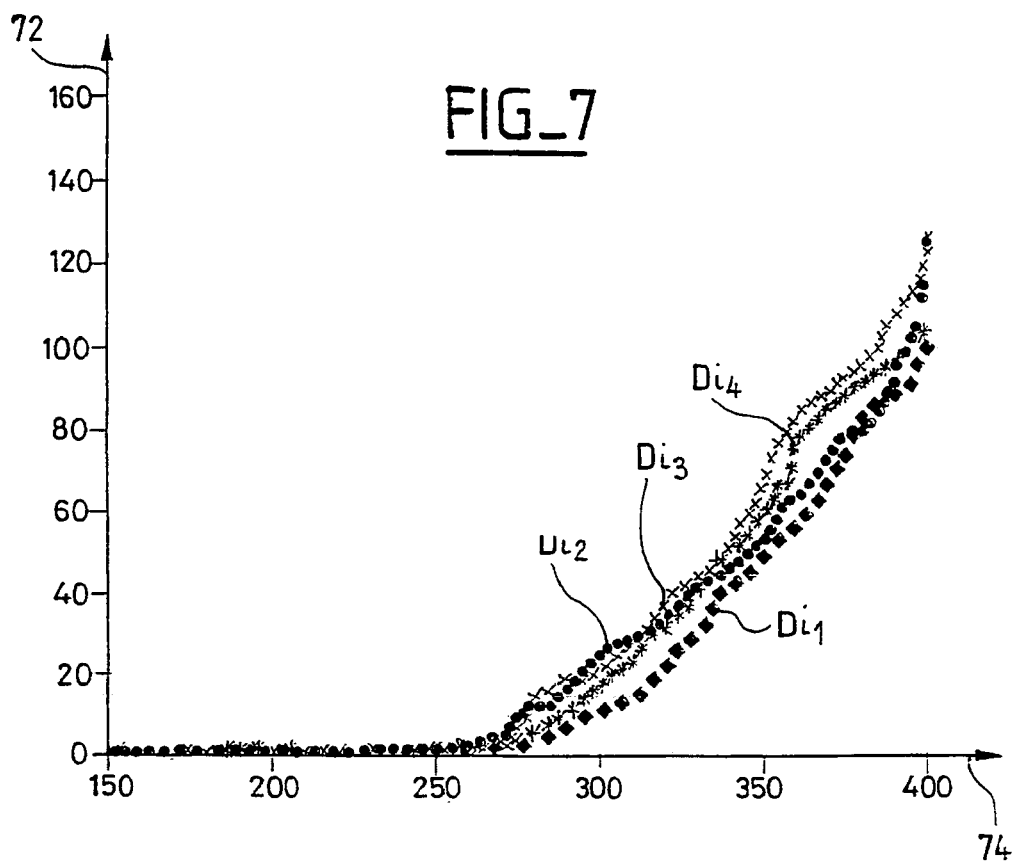
FIG_7
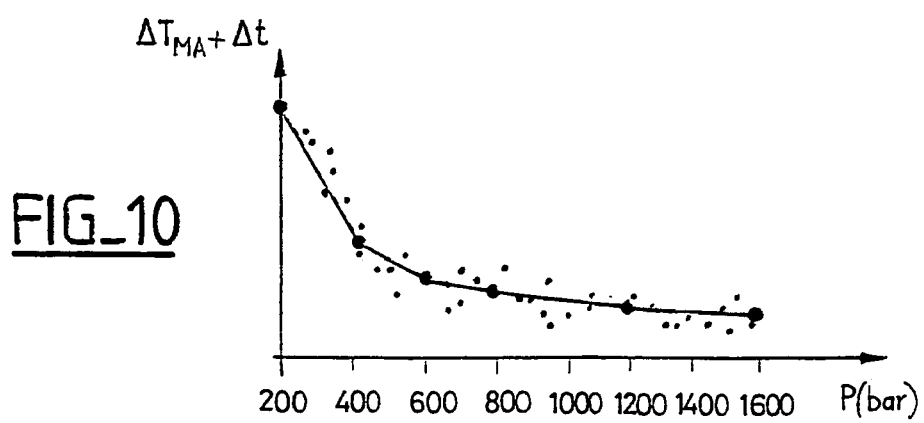
FIG_10
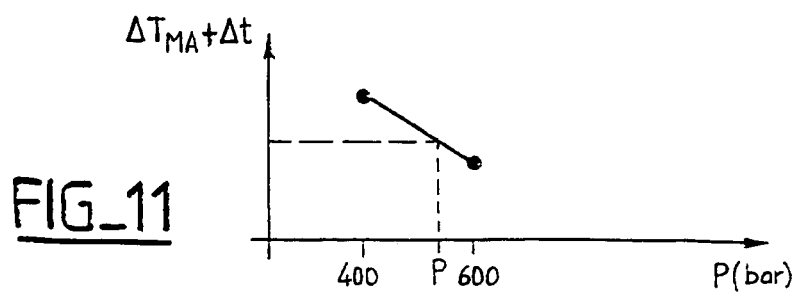
FIG_11

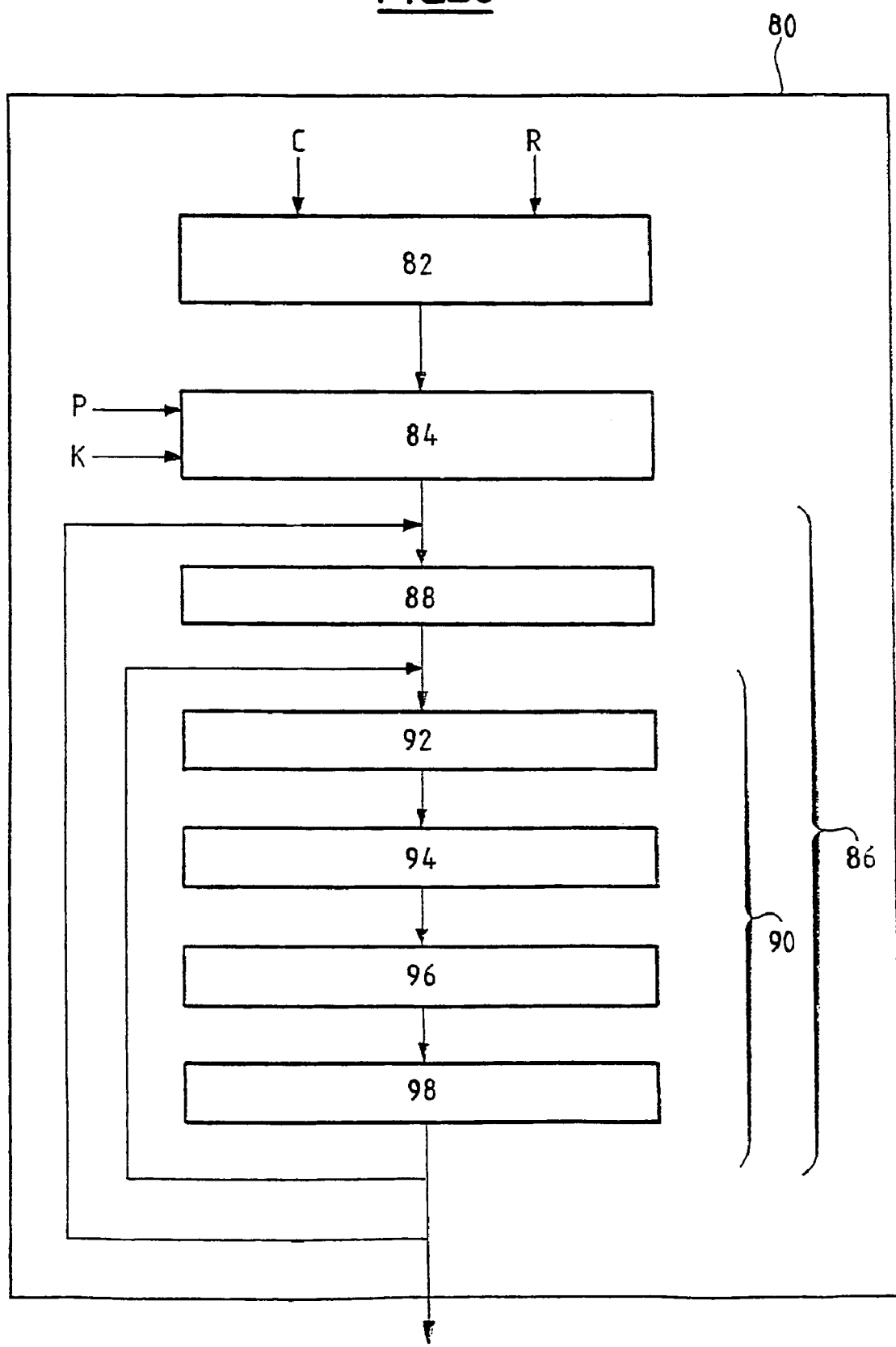

FIG_9
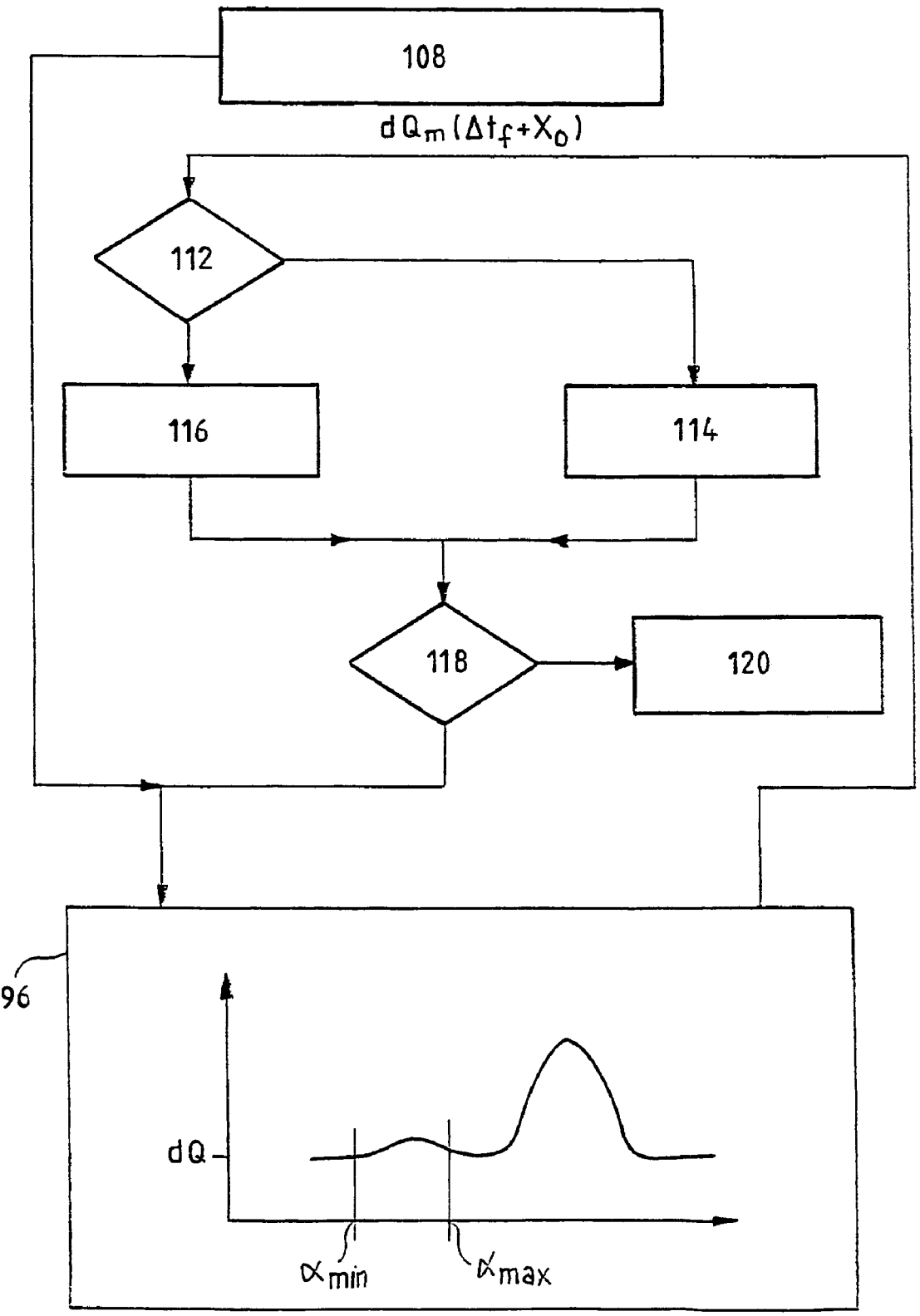

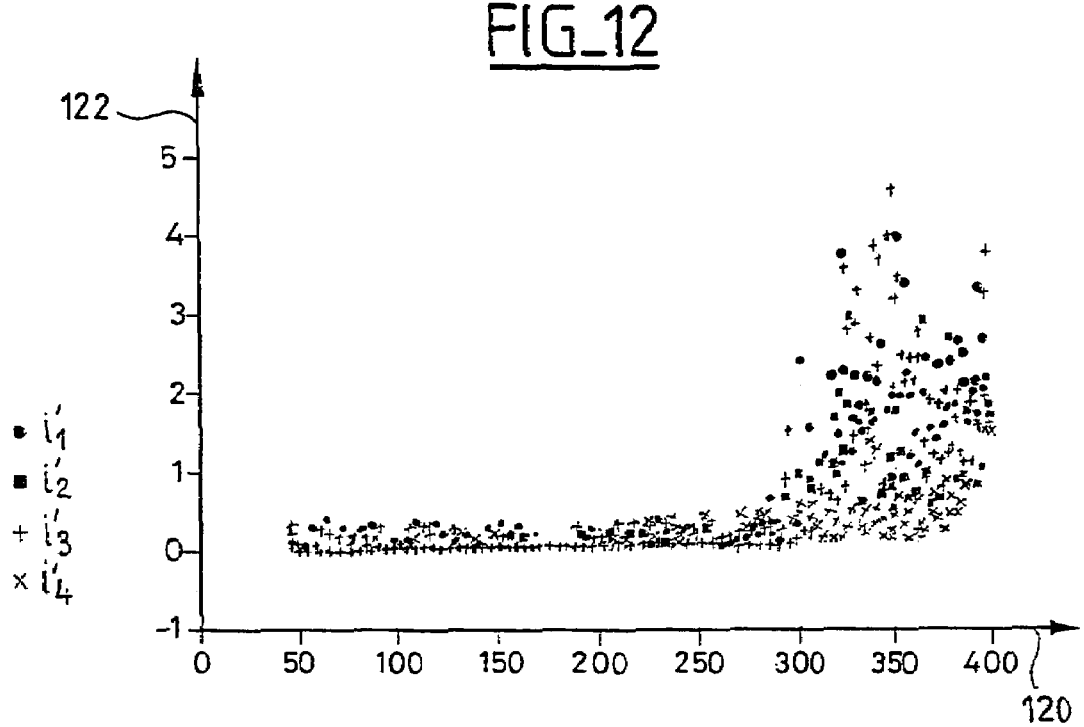
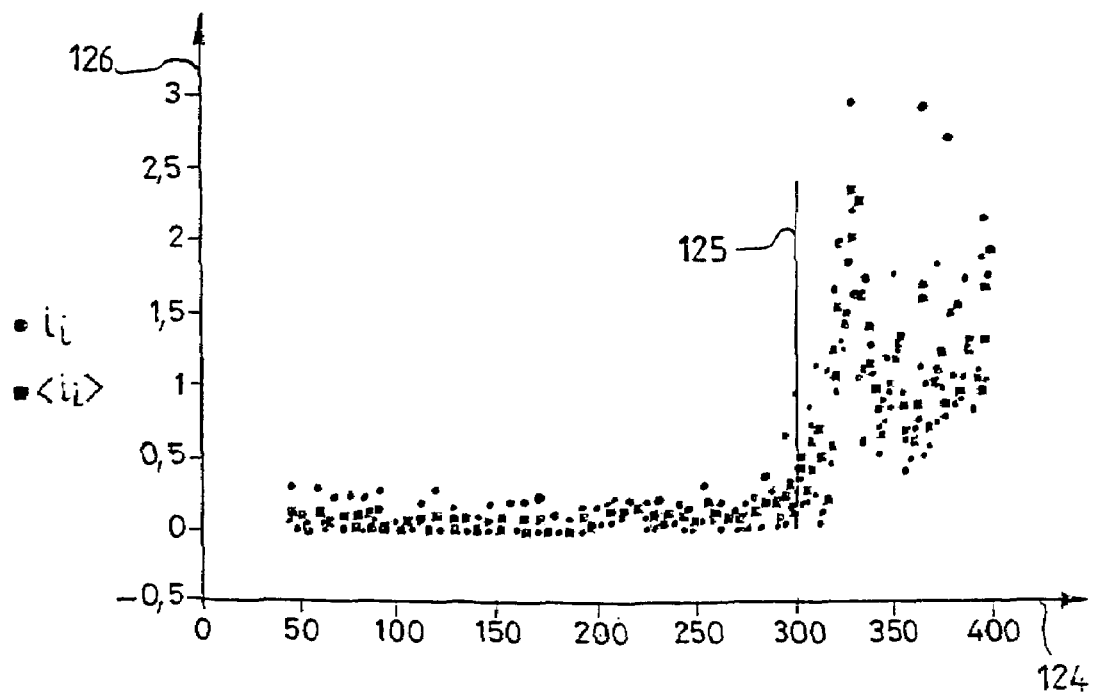

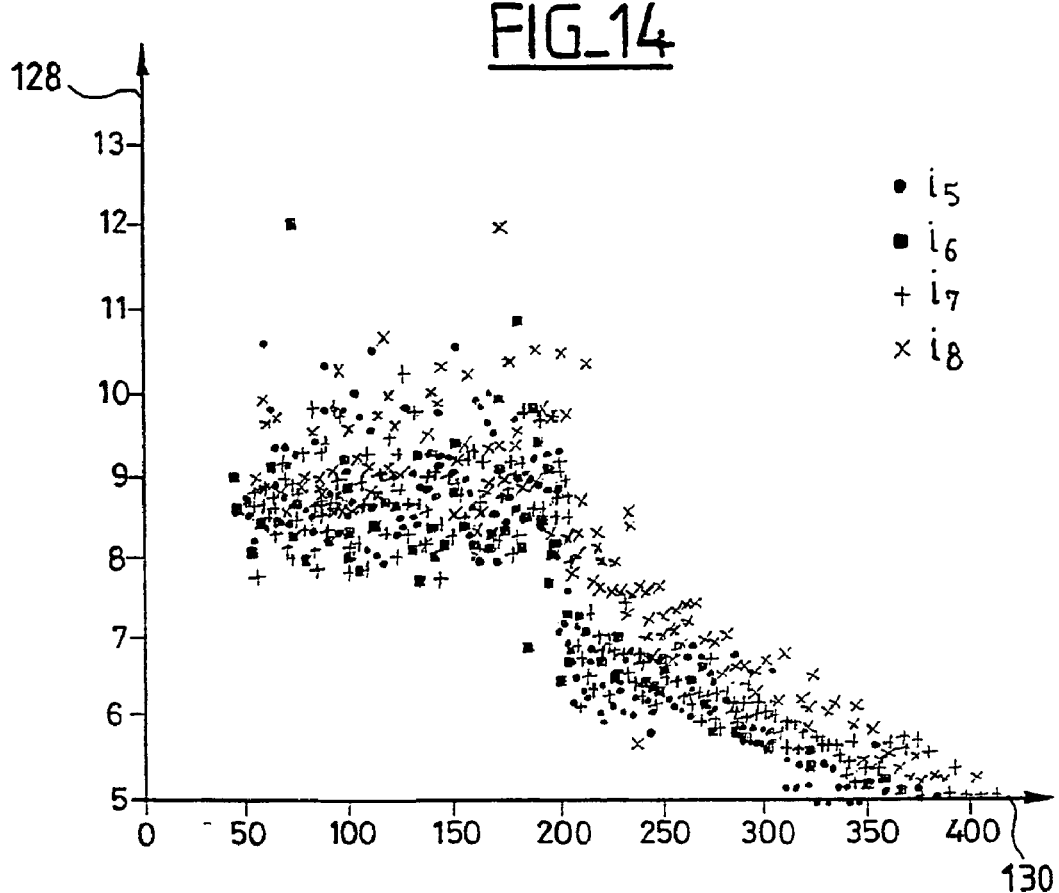
FIG_14
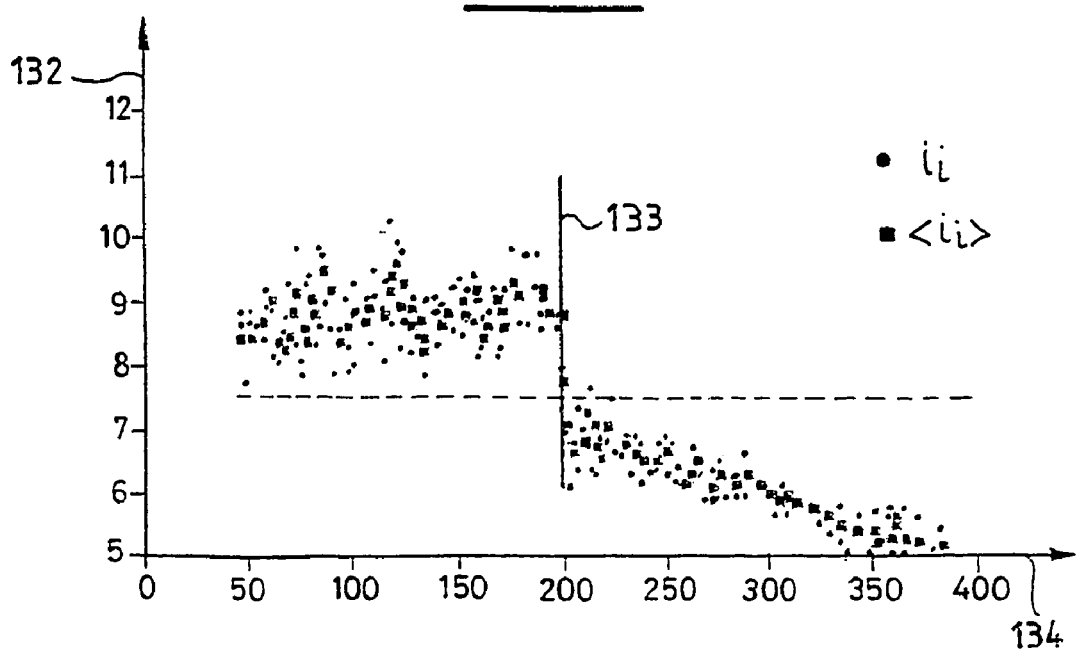
FIG_15

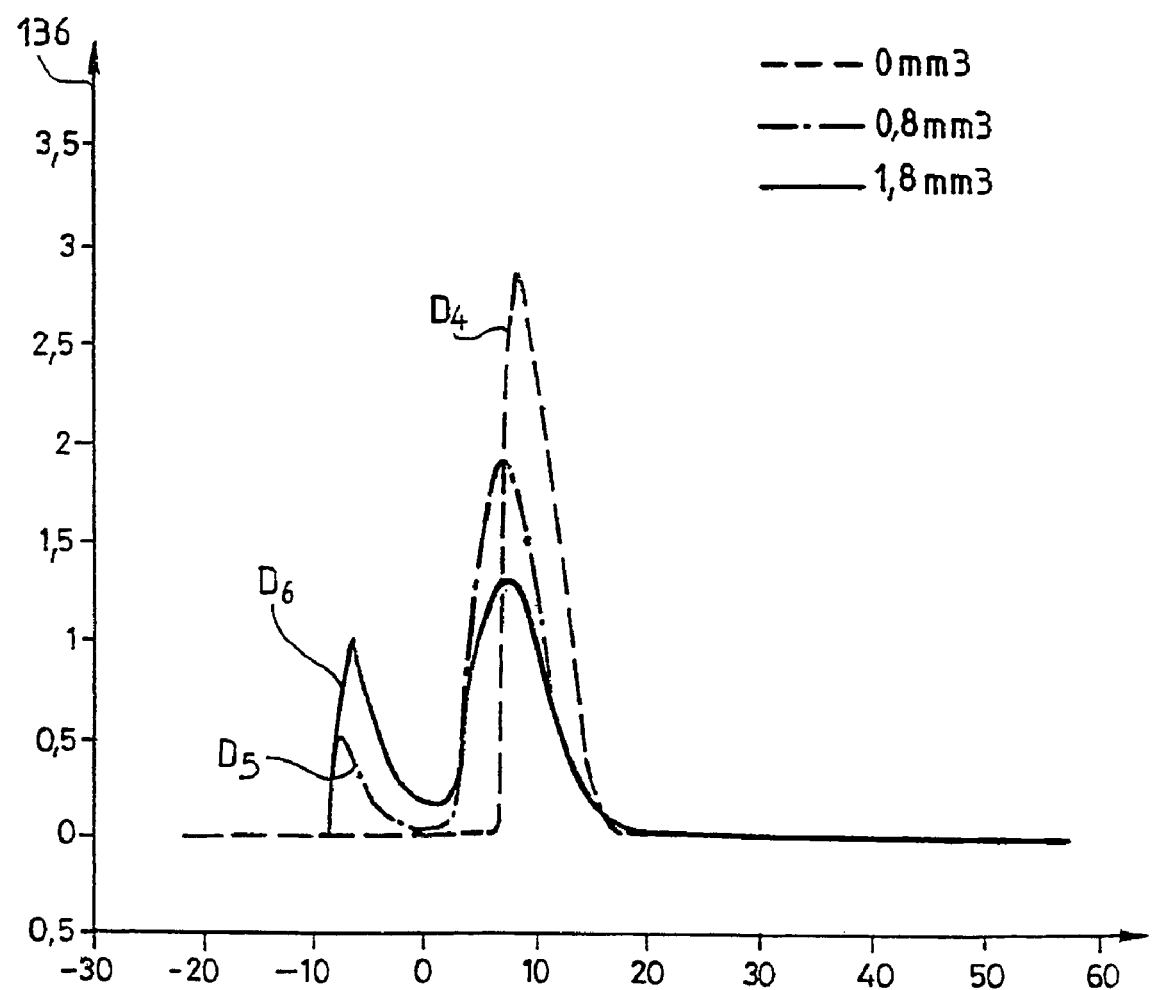
FIG_16

DIESEL ENGINE COMPRISING A DEVICE FOR CONTROLLING THE FLOW OF INJECTED FUEL

BACKGROUND OF THE INVENTION

The present invention relates to a diesel engine comprising a device for controlling the flow of injected fuel.

In a common-rail diesel engine 10 (FIG. 1), each cylinder 12, 14, 16 and 18 has a combustion chamber $13_{12}, 13_{14}, 13_{16}$ or $13_{18}$ into which a fuel is injected by means of an injector $20_{12}, 20_{14}, 20_{16}$ or $20_{18}$ connected to the common rail 22. In the latter, the fuel is maintained at high pressure by a pump connected by a duct 26 to the tank (not shown) of the vehicle, thus permitting injections of fuel into each cylinder at high pressures, generally comprised between 200 and 1600 bars.

The operation of each injector $20_i$ is controlled by a unit 28 which determines the amount of fuel injected by this injector into the chamber $13_i$. For this, the unit 28 receives information such as the torque C required by the driver of the vehicle or the pressure P of the fuel in the common rail, and accordingly sets an opening or activation period of the injector $20_i$ such that the latter injects into the chamber $13_i$ the amount of fuel necessary to obtain the torque required by the driver.

This activation period is determined according to the amount of fuel that is to be injected into the chambers and according to the fuel pressure in the common rail. The activation period furthermore depends on the characteristics of the injector; this is because it is preset by the designer, for example by experiment. However, it is known that the operation of an injector equipping a vehicle differs from its preset operation. In fact, the preset operation is established by means of an injector taken as a model, making no allowances for the tolerances accepted when the injectors are machined, nor especially of wear, as shown below by FIG. 2 representing the operation of an injector $20_i$ after a certain time of operation, for example the injector $20_{12}$, and that of an injector model used in determining the data stored in the unit 28.

In this FIG. 2, the amount of fuel injected in milligrams (axis of ordinates 32) into the combustion chamber of cylinder i by the model injector (curve 34) in relation to the duration (axis of the abscissae 30) of the activation of this injector established in microseconds. Curve 36 corresponds to the injection performed by the injector $20_{12}$ used.

Beginning at curve 34, it is found at first that, for a model injector, there is a minimum activation period $\Delta T_{MA}$ from the issuance of the injection command (instant $T_{28}$) before the fuel injection starts in the chamber and, in a second period the amount of fuel injected varies linearly in relation to time, this relationship between the amount of fuel injected and the activating period being referred to hereinafter as the operating gradient of the model injector.

Curve 36 shows that, for the real injector $20_{12}$ used, the minimum activation period is longer: $\Delta T_{MA}$ and $\Delta t$. Moreover, the operating gradient of the injector $20_{12}$ is not as great as that of the injector taken as model.

These differences adversely affect the operation of the engine. Indeed, when an injector operates with an offset $\Delta t$ and/or with a modified operating gradient, the activation periods controlled by unit 28 cause the injection of an amount of fuel into the combustion chambers different from the predetermined optimum amount. For example, considering that an amount $K_m$ (FIG. 2) of fuel is to be injected into the cylinder 12, the unit 28 sets a period of activation $\Delta T_K$ determined from the curve 34. However, the injector $20_{12}$ then actually introduces a quantity $K_{12}$ of fuel determined by the curve 36, which is perceptibly less than the amount expected, on account of differences of operation due to tolerances, to machining and/or to wear on the injectors.

The higher the fuel pressure is, the more these differences are undesirable, for when this pressure increases the difference in the amounts of fuel injected between an injector—for example one that has been operating for some time—and a model injector generally increase.

These differences impair performance (torque and power), increase combustion noise and/or increase pollutant emissions of the engine, particularly the nitrogen oxides.

These problems can affect all the cylinders of an engine or each cylinder separately.

SUMMARY AND OBJECTS OF THE PRESENT INVENTION

The present invention results from the finding that correcting the injection offset $\Delta t$ of an injector is sufficient to correct satisfactorily the operation differences of the real injectors in relation to the predetermined operation, as described hereinbelow with the aid of FIGS. 3 and 4.

FIG. 3 shows the offsets $\Delta g$ (axis of ordinates 42), measured in milligrams, between the amount of fuel requested (axis of the abscissas 40), also in milligrams, at a first injector having only one injection offset $\Delta t$, on the one hand, and on the other hand the amount of fuel in milligrams actually injected by this injector. Various measurements $44_1$, $44_2, 44_3, 44_4, 44_5$ and $44_6$ made at different fuel pressures at injection (230, 540, 680, 810, 950 and 1200 bars for the curves $44_1$ to $44_6$, respectively) show that the greatest offset $\Delta g$ takes place for fuel commands of less than 15 milligrams, particularly for commands of the order of 7 milligrams. These measures relate to an offset $\Delta t$ without gradient modification with respect to the model injector.

FIG. 4 shows the measured differences $\Delta g'$ (axis of the ordinates 42') in milligrams between the amount of fuel commanded (axis of the abscissas 40'), also given in milligrams, and the amount of fuel actually injected in the case where one considers for the tested injector not only an offset $\Delta t$ but also a modified working gradient.

Comparing the offsets $\Delta g$ and $\Delta g'$ it is observed that, for commanded amounts of fuel less than 15 milligrams, the offset $\Delta g$ of FIG. 3, where only an offset $\Delta t$ at the injection is taken into account, is practically equal to the offset $\Delta g'$ of FIG. 4 where the same offset $\Delta t$ at injection and a different working gradient are considered.

Furthermore, the regulation, especially the European, tends to limit the amount of fuel injected into the combustion chambers to 15 mg in ordinary driving conditions. In other words, the injected amounts that would be above this level are not representative of most of the travel performed by a vehicle, particularly in city driving.

To determine the minimum activation period ($\Delta T_{MA}$ and $\Delta t$) really needed at this injector in order to perform an injection of fuel into the combustion chamber, that is to say, the minimum activation period of the injector, a series of activations of an injector can be performed with increasing duration so that, when an injection of fuel is detected, the minimum duration detected is considered as the minimum activation period.

However, it may be difficult to detect a weak injection of fuel, for the pilot injection for example, especially because the latter is close to the TDC which generates a fuel injection greater than the fuel injection proper to pilot injection.

This is the reason why the invention concerns a diesel engine having a device for controlling the rate of fuel injection, comprising at least one fuel injector feeding a combustion chamber, controlled by a processor provided with means for commanding a series of injector activations of different durations, means for measuring a minimum activation period between the issuance of a command and the flow of an injection, and means for further controlling the injector according to the measured minimum activation period, characterized in that it includes means for evaluating the release of heat performed by the air-fuel mixture injected into the chamber and measuring the minimum activation period on the basis of these evaluations.

By measuring releases of heat, the detection of a fuel injection, and hence the determination of the minimum activation period, is performed with great precision.

Then, by comparing the measured minimum activation period ($\Delta T_{MA}$ and $\Delta t$) with the predetermined minimum activation period (($\Delta T_{MA}$) the processor can determine the offset ($\Delta t$) affecting this injector. The offset ($\Delta t$) being determined, the processor can correct its commands with respect to the injector, by considering that the minimum activation period necessary for the start of an injection is equal to the minimum predetermined activation period ($\Delta T_{MA}$) modified by the offset ($\Delta t$), positive or negative, determined by measurement. Thus, the activation periods commanded by the processor are corrected for this offset ($\Delta t$).

In an embodiment, the means for controlling the activation period include means for modifying a predetermined minimum activation time period by an offset resulting from measurement.

According to an embodiment, the processor comprises means so that the activations used in measuring the pressure will be different from the activations controlling the principal fuel injections intended for generating torque in the motor.

According to an embodiment, the processor comprises means so that the activations will correspond to pilot injections intended to establish optimum temperature conditions in the cylinder for the main injections.

In an embodiment, the processor comprises means for evaluating the release of heat produced by the air and fuel mixture in the chamber and measuring the minimum activation period from these evaluations.

In an embodiment, the processor comprises means for evaluating the release of heat based on pressure measurements with the aid of a formula of the type:

$$\delta Q = 1/(\gamma-1)*(\gamma P*dV + V*dP),$$

where $\delta Q$ is the release of heat, P and V the pressure and the volume of the mixture in the chamber, dP and dV their variations and $\gamma$ is a constant.

In an embodiment, the processor comprises means for determining the minimum activation period by evaluating the mean release of heat in an interval of the driving cycle comprising the pilot injection.

In an embodiment, the motor comprises several injectors supplied with fuel by a common rail.

In an embodiment, the series of activations of the injector is performed at constant feed pressure and engine speed.

In an embodiment, the processor comprises means for performing the series of activations in a periodical manner.

The invention also concerns a processor controlling the rate of fuel injection in an internal combustion engine comprising means for controlling a series of activations of various duration of an injector supplying a combustion chamber, means for measuring a minimum activation period between the issuance of a command and the start of an injection, and means for further controlling this injector according to the measured minimal activation period, characterized in that it comprises means for evaluating the release of heat caused by the air and fuel mixture in the chamber and measure the minimum activation period based on these evaluations.

In an embodiment, the processor comprises means for modifying a predetermined minimum activation perio of an offset resulting from the measurement.

According to an embodiment, the processor comprises means so that the activations used in measuring the minimum activation period will be distinct from activations commanding the main fuel injections intended to generate torque in the motor.

In an embodiment, the processor comprises means so that the activations will correspond to pilot injections intended to provide optimum temperature conditions in the cylinder for the principal injection.

BRIEF DESCRIPTION OF THE DRAWINGS

Other characteristics and advantages of the invention will appear with the description of some of its embodiments, given below on a non-restrictive basis and referring to the annexed drawings, wherein:

FIG. 1, already described, shows a known diesel engine equipped with a common rail.

FIG. 2, already described, shows offsets of operation between a real injector and a model injector.

FIGS. 3 and 4, already described, show offsets of operation between real injectors and a model injector.

FIG. 5 shows measurements of pressure in a combustion chamber according to a first embodiment of the invention.

FIG. 6 shows evaluations of heat released in a combustion chamber according to a second embodiment of the invention.

FIG. 7 shows evaluations of heat releases measured in different combustion chambers for different activation periods of the injectors of these chambers.

FIG. 8 is a diagram representing in block form different operations performed by a central unit in accordance with the invention.

FIG. 9 is a diagram, also in block form, of an operation represented in FIG. 8.

FIG. 10 represents a linearization of measurements performed in a combustion chamber according to the invention.

FIG. 11 represents a use of the linearization described at FIG. 10.

FIGS. 12 and 13 represent current measurements according to a third embodiment of the invention.

FIGS. 14 and 15 represent current measurements according to a fourth embodiment of the invention, and FIG. 16 represents a combination of the third and fourth embodiments of the invention.

DETAILED DESCRIPTION OF THE EMBODIMENTS

The various embodiments of the invention described below relate to diesel engines having cylinders equipped with a fuel injector controlled by a central unit (microprocessor). This unit comprises means, pursuant to the invention, for performing a series of activations of various duration for each injector and for modifying the activation periods controlled at this injector with an offset ($\Delta t$) determined between the minimum measured activation period and the minimum predetermined activation period.

Furthermore, in these embodiments the measurement of the minimum activation period of an injector is performed by detecting the variations of a parameter of the combustion chamber that is modified by an injection of fuel, this chamber comprising means for transmitting these detections to the unit.

In a first embodiment, the physical parameter detected is the pressure in the combustion chambers. For this purpose, each chamber has a detector measuring its internal pressure and transmitting such measurements to the central unit, the latter having means for receiving these measurements and determining the measured minimum activation period.

In this first embodiment, as in all the embodiments described below, the series of activations commanded at injectors to detect their offset are distinct from activations commanding the injection of fuel, called main injection, which supplies the torque of the engine. More precisely, these activations correspond to fuel injections known as pilot injections, which make it possible to create optimum conditions of temperature and pressure in the combustion chambers for the main injection that follows.

These two injections—the pilot and the main—are represented in the diagram of FIG. 5 where the axis 52 of the ordinates corresponds to the pressure measured in bars in a combustion chamber of a cylinder and the axis 50 of the abscissas corresponds to the angle of the crankshaft of this cylinder, that is, the course of the cycle of four events (injection, compression, combustion, and expansion and exhaust) of combustion occurring in this cylinder. The angle 0 corresponds to the position of the piston at the top dead center (TDC), the negative angles correspond to the stages of injection and compression, and the positive angles correspond to the stages of combustion, expansion and exhaust.

The measurement of pressure in the chamber fed by the injector tested is performed for various increasing activation periods of $d_1$, $d_2$, $d_3$ and $d_4$ at a constant fuel injection pressure such as 200, 400, 600, 800, 1200 or 1600 bars. A curve $D_i$ indicating the pressure measured in the cylinder as the combustion cycle advances is then obtained, at a given fuel pressure at injection, for each injector activation period $d_i$.

It is then observed that the length of period $d_i$ is such that no pilot injection is performed, whereas the periods $d_2$ (curve $D_2$), $d_3$ (curve $D_3$) and $d_4$ (curve $D_4$) give rise to a pilot injection characterized by a pressure rise 56 due to the pilot injection, while a second pressure increase 58 is brought about by the main injection.

By commanding a series of pilot injections of different activation period in each cycle, a control unit can set the minimum activation period for an injector by verifying the presence of a pressure increase 56 for this period, which then corresponds to the minimum activation period measured for this injector. The unit determines the offset $\Delta t$ of this injector, that is to say, the separation between the predetermined minimum activation period and the measured minimum activation period, and then correctly controls the injector while further affecting (after these actions) the activation period commanded at this injector with an offset $\Delta t$.

Each curve of FIG. 5 is obtained by a plurality of tests performed while the engine is running at a set speed and load, the amount of fuel injected at the period of the main injection being also constant.

It can be difficult to measure the pressure increase 56 due to the pilot injection, particularly since the latter is close to the TDC which generates a pressure increase greater than the pressure increase 56 proper to the pilot injection. In this case the measurements may be insufficiently precise. This is why, in a second embodiment of the invention, measurements of heat released in a combustion chamber are used as the physical parameter permitting the determination of an offset of an injector. Such heat releases can be determined, for example, from the pressure measurements performed above. The detection of fuel injections, and hence the determination of the measured minimum activation period is then performed with greater precision, as described below.

The heat release $\delta Q$ produced in a combustion chamber at the period of a fuel injection gives rise to a variation of the pressure in the chamber. In fact, by considering the first principle of thermodynamics applied to the system made up of the gaseous mixture of air and fuel injected into the cylinder, it is possible to write:

$$dU=\delta W+\delta Q \quad (1)$$

where dU is the internal variation of energy of the fuel, and $\delta Q$ and $\delta W$ are the heat and the work received by this mixture.

Since the mixture is considered as a perfect gas, it is also possible to write:

$$dU=n*Cv*dT \quad (2)$$

and $$PV=nRT \quad (3)$$

where n is the number of moles of the mixture and Cv is its heat capacity, dT is its temperature variation and P, V and T are, respectively, its pressure, its volume and its temperature, R being a constant equal to 8.314.

The elemental work $\delta W$ of the mixture in extension being equal to $-PdV$, the relationship (1) becomes:

$$\delta Q=n*Cv*dT+PdV \text{(1 bis)}.$$

By differentiating (3) one then obtains $$n*dT=(P*dV+V*dP)/R,$$

making it possible to develop the equation (1 bis) into $$\delta Q=(Cv/R+1)*P*dV+Cv/R*VdP \quad \text{(1 ter)}.$$

For a perfect gas we have the relation $Cv/R=1/(\gamma-1)$, with $\gamma$ polytropic coefficient, $\gamma \approx 1.34$, which permits obtaining, beginning from (1 ter):

$$\delta Q=1/(\gamma-1)*(\gamma P*dV+V*dP). \quad (4)$$

$\delta Q$ breaks down to $\delta Q=\delta Q_{combustion}+\delta Q_{wall}$, wherein $\delta Q_{combustion}$ represents the heat received by the mixture at the period of the combustion, and $\delta Q_{wall}$ the heat lost to the wall. Initially, the term $\delta Q_{wall}$ is ignored.

The relationship between the release of heat and the advancement of the working cycle of the cylinder is represented in FIG. 6 which determines the heat release $\delta Q$ (ordinate axis 62) evaluated in joules per degree of crankshaft in a combustion chamber as a function of the advancement of the combustion cycle in the cylinder (axis 60 of the abscissas), measured in crankshaft degrees. This FIG. 6 was obtained by applying the above formula (4) to pressure measurements obtained as shown in FIG. 5, the volume V and the variation dV of the gaseous mixture being obtained from the volume of the chamber and its variation.

In this FIG. 6, various curves ($D'_1$, $D'_2$, $D'_3$, and $D'_4$ representing the heat releases evaluated as a function of different activation periods ($d'_1$, $d'_2$, $d'_3$ and $d'_4$, respectively) of the injector tested at constant pressure of the fuel injection into the chamber, such as 200, 400, 800, 1200 or 1600 bars. It is then observed that a heat release indicating a pilot injection is detected more easily than an increase of pressure such as described above (zone 56 of FIG. 5), particularly because at the top dead center after the pilot injection, no heat release occurs. It is also found that, for the duration d'$_1$ of the activation corresponding to the curve D'$_1$, no pilot injection was made.

Hence, the detection of the minimum activation period by means of the calculated heat releases is more precise, as is shown in FIG. 7 which represents heat release measurements (ordinate axis 72) in joules per crankshaft degree, in relation to various activation periods measured in microseconds (axis 74 of abscissas) for four injectors tested i$_1$ (curve D$_{i1}$), i$_2$ (curve D$_{i2}$), i$_3$ (curve D$_{i3}$) and i$_4$ (curve D$_{i4}$). A measure of heat release is obtained, for an injector i$_j$ and for a given activation period d$_j$, by integrating the surface 56' of FIG. 6 obtained with the injector i$_j$ and the activation period d$_j$.

It is thus found that the heat release passes from zero value to a positive value when the pilot injection has actually taken place in the cylinder, around 265 microseconds, such a variation being easier to detect than a variation in the growth of a parameter, as done in the first embodiment.

Moreover, the tests performed to measure heat show very little scatter in the results obtained, as well as great strength for the various pressures at which these tests are performed.

In FIG. 8 there is shown a diagram of the operations performed by a unit 80 correcting the injection commands issued on connection with four injectors according to the invention. For this purpose, this unit 80 is programmed for the engine speed R and the torque C of the engine so as to detect (block 82) whether the engine is running at an operating point at which a determination of the injection offset is to be performed, this point being defined by conditions of torque C and speed R as well as by the pressure P of the fuel upon injection, this pressure P being set by the terms of torque C and the engine speed R.

If this is the case, the unit 80 performs a determination (block 84) which sets the start of the fuel injection at predetermined values. In this example, these starting moments are set, for the main injection, at plus fifteen degrees, and for the pilot injection at minus fifteen crankshaft degrees. The main injection moment is set beforehand at the moment of the pilot injection so as to assure maintenance of the torque put out by the engine and so as not to interfere with the running of the vehicle when the measurement is taken.

After an engine stabilization period of about 100 cycles, the engine speed R, the torque C and the amount K of fuel injected at the main injection are recorded in the memory of the unit 80.

Then, for each injector i that is considered in the engine, the unit 80 performs a series of operations 86 evaluating the offset of the injector i in the conditions previously stored of the engine speed R, torque C and amount of fuel injected K. Thus the series of operations 86 can be performed four periods, once for each injector i, so as to determine an offset $\Delta t_i$ (P) for each injector i at the fuel injection pressure P.

Each series of operations 86 includes five sequences 90 of evaluation of the offset $\Delta t_i$ (P) of the injector in question. When a sequence 90 of evaluations is started for an injector (block 88) the following operations are performed:

A first operation (block 92) determines a heat release threshold S$_{dQ}$ (used as described further on) by evaluating the mean heat release measured a little before the pilot fuel injection is performed, then by adding to this mean value dQ$_m$ a constant amount such that a heat release greater than the threshold S$_{dQ}$ is detectable in relation to the average release dQ$_m$. In this example, four cycles of measurements are used in computing the average heat release dQ$_m$ and the constant amount added is 0.15 J/deg. In a second operation (block 94), the unit 80 sets a short initial activation period, corresponding for example to the injection of 0.01 milligram of fuel, to initiate the series of different activation periods and the determination (block 96) of the offset $\Delta t_i$ (P) affecting the injector i, as described further on with the aid of FIG. 9. Then, since the offset $\Delta t_i$ (P) has been measured, its value is stored in memory (block 98) in association with the injection pressure P used, in order to linearize the measurements on a pressure domain, as described further on with the aid of FIGS. 10 and 11.

The determination of the offset $\Delta t_i$ (P) shown in FIG. 9 uses an automatic computation to determine the shortest activation period resulting in a pilot injection of fuel into the cylinder, i.e., a release of heat. To this effect, the various activation periods commanded by unit 80 are considered as composed of a fixed portion $\Delta t_f$ and a variable portion X$_o$. The determination of the minimum activation period, or of the minimum activation period of an injector, therefore consists in searching for a minimum value of X$_o$, called X$_{om}$, such that, after an activation period equal to $\Delta t_f$+X$_{om}$ the heat release measured in the combustion chamber will be greater than S$_{dQ}$.

Such a search can be carried out by various processes. In this example, a dichotomy is used to reduce an interval defined by initial variables X$_{max}$ and X$_{min}$ defined in an operation initiating the dichotomy (block 108) such that, for an activation period $\Delta t_f$+X$_{max}$, equal to a release of heat due to a pilot injection will be detected, and that, for an activation period equal to $\Delta t_f$+X$_{min}$, this pilot injection will not be detected, while the variable X$_o$ is then set at X$_{max}$+X$_{min}$/2.

Then the computer 80 performs heat release measurements (block 96) for an activation period equal to $\Delta t_f$+X$_o$, as described by means of FIG. 6, i.e., by integrating the release 56' measured for an activation period of $\Delta t_f$+X$_o$.

In other words, in an operation 96 the average heat release dQ$_m$($\Delta t_f$+X$_o$) is measured for the period [$\alpha_{min}$; $\alpha_{max}$] or $\alpha_{min}$ and $\alpha_{max}$ corresponding to crankshaft angles before and after the crankshaft angle where the pilot injection, if any, occurs.

Comparing (block 112) this average release dQ$_m$($\Delta t_f$+X$_O$) with the release threshold S$_{dQ}$ previously calculated on this same interval [$\alpha_{min}$; $\alpha_{max}$], one determines whether the release dQ$_m$($\Delta t_f$+X$_O$) measured is above the threshold S$_{dQ}$, in which case it can be deduced that X$_{min}$ is closer to X$_{Om}$ than X$_{max}$. In this case the variable X$_{min}$ is held at its initial value and the variable X$_{max}$ takes on the value of the variable X$_O$, the value of this last variable X$_O$ being the average (X$_{min}$+X$_{max}$)/2 of these new terminals (X$_{min}$; X$_{max}$ (block 114).

Inversely, if the release dQ$_m$($\Delta t_f$+X$_O$) is less than the threshold S$_{dQ}$, it can be concluded that X$_{max}$ is closer to X$_{Om}$ than X$_{min}$. In this case, the variable X$_{max}$ is held at its initial value, the variable X$_{min}$ takes the value of the variable X$_O$, the value of this latter value X$_O$ being calculated from the new terminals (X$_{min}$; X$_{max}$) (block 116).

A convergence test (operation 118) makes it possible to determine whether the period [X$_{min}$; X$_{max}$] satisfies a given convergence criterion indicating the desired accuracy in the calculation of the minimum activation period ($\Delta t_f$+X$_O$). If this convergence criterion is satisfied, that is to say, if the interval [X$_{min}$; X$_{max}$] is less than a given period of time, the unit 80 determines the final value of X$_O$ as being equal to X$_{om}$, that is to say, such that the measured minimum activation period is $\Delta t_f + X_{om}$ under the given conditions (pressure and engine speed) (block 120).

If not, since the period $[X_{min}; X_{max}]$ is too great, the average heat release in the next period is calculated (block 96) as well as the test 112 on this new value and the operations (blocks 114 and 116) already described.

Saving this result (block 98 of FIG. 8) permits obtaining the five values calculated for each given set of conditions of pressure and engine speed.

These operating conditions are chosen so as to cover the entire working range of the engine. To this effect, considering that this range covers from 200 to 1600 bars (FIG. 10) a linearization of the measured offsets is performed on the pressure ranges covering 200 bars of variation, such as a range from 400 to 600 bars.

Then, when the engine is running at a pressure P within such a range of linearization, the value of the offset considered for this pressure P corresponds to the value determined by this linearization (FIG. 11).

In another embodiment of the invention, the injection lag of an injector is detected by measuring the ionic current created by a combustion of fuel. For this purpose an ionic current detector is integrated into the chamber, for example by means of a preheating plug located in the cylinder, this preheating plug acting as an electrode transmitting a current when ions issuing from a combustion are situated in its vicinity. In another embodiment, the injector is used as an electrode.

FIG. 12 represents such an electric current (axis of ordinates 122) expressed in volts for the various activation periods of the injectors tested. In this FIG. 12 the maximum ionic current relating to four injectors $i'_1$, $i'_2$, $i'_3$ and $i'_4$ are represented. These activation periods are expressed in microseconds (axis of the abscissas 120). It is then observed that a lengthening of the activation periods gives rise to an increase in the ionic current measured.

However, due to its local nature, the ionic current measurement results in more disperse measurements than those relating to pressure or a release of heat. This is why, as shown in FIG. 13 for an injector $i_i$, it is possible to make several ionic current measurements for one and the same activation period and to consider the average $<i_i>$ of these activation currents as the measurement associated with this period so as to determine the minimum activation period 125 generating a pilot injection.

Another embodiment of the invention uses the detection of the ionic current generated by the main injection to detect the occurrence of a pilot injection. Because, when a pilot injection takes place prior to the main injection, the main amount of the fuel will burn considerably sooner than it will when it arrives in a cooler combustion chamber.

In this FIG. 14, the instant in which the main injection is detected is shown, this instant being defined by crankshaft degrees (axis of ordinates 128) in the combustion chamber for different activation periods (axis of abscissas 130) signaled to injectors $i_5$, $i_6$, $i_7$ and $i_8$ for pilot injections.

Note first of all that the distribution of the measurements taken in this embodiment is different from the distribution of the current measurements performed in the embodiment previously described. In fact, the measurements shown in FIG. 14 relate to the measured instant of the main fuel injection detected by measuring an ionic current. So, in the absence of a pilot injection (activation period between 50 and 175 microseconds), the main injection is detected for crankshaft angles comprised mostly between eight and six degrees. Inversely, in the presence of pilot injection (activation period between 200 and 400 microseconds), the main injection begins more quickly to stabilize at five crankshaft degrees.

Secondly, it is noted also that the variation of the measured value (crankshaft degrees) is greater, and therefore more easily detectable in this embodiment than the ionic current variation in the embodiment previously described. In fact, the ionic current created by the main injection is greater than the ionic current created by a pilot injection and is easier to measure.

In a manner similar to the embodiment previously described, multiple measurements relating to an injector $i_i$ (FIG. 15) can be used so as to obtain a mean measurement $<i_i>$ used to determine the threshold 133 indicating the minimum activation period generating a pilot injection.

However, the crankshaft degree measurements also have an extended distribution and the minimum injection period wherein the lessening of the ionic current begins may not be determined with sufficient precision.

This is why in one embodiment a combination of the detection of the two phenomena described above is used, that is, the detection of an ionic current due to a pilot injection, and the influence of this injection on the main injection, to obtain a fine and linear detection of the instant of injection as represented in FIG. 16.

In this FIG. 16 there is shown the ionic current measurement (axis of ordinates 136) performed in a cylinder for different activation periods $d_4$ (curve $D_4$), $d_5$ (curve $D_5$ and $d_6$ (Curve $D_6$) of its injector. The current measurements being represented as the cycle advances in crankshaft degrees (axis of abscissas 138), it is noted that, in the presence of a pilot injection (curves $D_5$ and $D_6$), the main injection is faster and starts around 3 crankshaft degrees, whereas in the absence of pilot injection (curve $D_4$) the main injection is not detected until around eight crankshaft degrees. Otherwise the pilot injection (curves $D_5$ and $D_6$) is detected around minus eight crankshaft degrees.

In one embodiment of the invention, the measurement of the offsets and the memory entries resulting therefrom are performed periodically, for example every 1000 kilometers traveled by the vehicle.

In a variant of the invention, the measurements and memory entries are performed when the vehicle is serviced.

What is claimed is:

1. A diesel engine comprising a device for controlling the flow of injected fuel, comprising:
   at least one fuel injector feeding a combustion chamber; and
   a processor controlling said at least one fuel injector and comprising:
   means for controlling a series of injector activations of different durations;
   means for measuring a minimal activation period ($\Delta T_{MA} + \Delta t$) between the issuance of a command and the start of an injection;
   means for subsequently controlling said at least one injector according to the minimal activation period measured; and
   means for determining the release of heat ($\delta Q$) produced by the mixture of fuel and air in the combustion chamber and measuring the minimal activation period based on the determination.

2. The engine of claim 1, wherein said means for controlling comprises means for modifying a predetermined minimal activation period ($\Delta T_{MA} + \Delta t$) of an offset ($\Delta t$) based on the minimal activation period measured.

3. The engine of claim 2, wherein said means for measuring utilizes activations that are different from the activations controlling principal fuel injections intended to generate a driving torque.

4. The engine of claim 3, wherein the activations correspond to pilot injections intended to establish optimum temperature conditions in the cylinder for the principal fuel injections.

5. The engine of claim 1, wherein said processor comprises means for determining the heat release from measurements of pressure in the combustion chamber.

6. The engine of claim 5, wherein said means for determining the heat release from the measurements of pressure in the combustion chamber utilizes a formula of the type:

$$\delta Q = 1/(\gamma-1)*(\gamma P*dV + V*dP),$$

where $\delta Q$ is the heat release, P and V are the pressure and the volume of this mixture in the chamber, respectively, dP and dV are variations in P and V, respectively, and $\gamma$ is a constant.

7. The engine of claim 1, wherein said means for determining comprises means for determining the minimal activation period measured by determining the mean heat release in an interval of an engine cycle including a pilot injection.

8. The engine of claim 1, further comprising a common rail for feeding a plurality of injectors.

9. The engine of claim 1, wherein said processor comprises means for performing the series of injector activations at constant supply pressure and engine speed.

10. The engine of claim 1, wherein said processor comprises means for performing the series of injector activations in a periodical manner.

11. A processor for controlling the flow of injected fuel in an internal combustion engine, comprising:
   means for controlling a series of activations of different duration of an injector feeding a combustion chamber;
   means for measuring a minimal activation period ($\Delta T_{MA} + \Delta t$) between the issuance of a command and the flow of injected fuel;
   means for subsequently controlling said injector according to the minimal activation period measured; and
   means for determining the release of heat ($\delta Q$) produced by the mixture of fuel and air in the combustion chamber and measuring the minimal activation period based on the determination.

12. The processor of claim 11, further comprising means for modifying a predetermined minimal activation period ($\Delta T_{MA}$) of an offset ($\Delta t$) based on the minimal activation period measured.

13. The processor of claim 11, wherein said means for measuring utilizes activations that are different from the activations controlling principal fuel injections intended to generate a driving torque.

14. The processor of claim 13, wherein the activations correspond to pilot injections intended to establish optimum temperature conditions in the cylinder for the principal injections.

* * * * *